(12) United States Patent
Capers

(10) Patent No.: US 9,220,204 B2
(45) Date of Patent: Dec. 29, 2015

(54) POSITIONING SYSTEM

(76) Inventor: James E. Capers, Pauls Valley, OK (US)

(*) Notice: Subject to any disclaimer, the term of this patent is extended or adjusted under 35 U.S.C. 154(b) by 0 days.

(21) Appl. No.: 13/472,407

(22) Filed: May 15, 2012

(65) Prior Publication Data

US 2013/0074989 A1    Mar. 28, 2013

Related U.S. Application Data

(63) Continuation of application No. 11/827,485, filed on Jul. 11, 2007, now abandoned.

(51) Int. Cl.
| | | |
|---|---|---|
| A01G 23/091 | (2006.01) | |
| A01G 23/08 | (2006.01) | |
| A01G 23/083 | (2006.01) | |
| A01G 23/095 | (2006.01) | |
| B27B 17/00 | (2006.01) | |
| B27B 17/12 | (2006.01) | |
| A01G 3/08 | (2006.01) | |

(52) U.S. Cl.
CPC .............. *A01G 23/091* (2013.01); *A01G 3/086* (2013.01); *A01G 23/08* (2013.01); *A01G 23/083* (2013.01); *A01G 23/095* (2013.01); *B27B 17/0083* (2013.01); *B27B 17/12* (2013.01); *Y10T 403/32237* (2015.01)

(58) Field of Classification Search
CPC ... A01G 23/08; A01G 23/083; A01G 23/087; A01G 23/091; A01G 23/095

USPC .............. 144/34.1, 336, 338, 24.13; 414/704, 414/709, 721, 734; 241/101.72; 56/239–243, 332–340

See application file for complete search history.

(56) References Cited

U.S. PATENT DOCUMENTS

| | | | |
|---|---|---|---|
| 3,536,113 A |  | 10/1970 | Sutherland |
| 3,874,432 A | * | 4/1975 | Albright ...................... 144/34.1 |
| 4,121,777 A | * | 10/1978 | Kolstad et al. .................. 241/58 |
| 4,269,241 A |  | 5/1981 | Hickman |
| 5,501,257 A | * | 3/1996 | Hickman ...................... 144/34.1 |
| 5,709,254 A | * | 1/1998 | Argue .......................... 144/34.1 |
| 5,884,403 A |  | 3/1999 | Rogers |
| 6,408,906 B1 |  | 6/2002 | Moon et al. |
| 6,968,877 B1 | * | 11/2005 | Stokkeland .................... 144/4.1 |
| 7,086,435 B1 |  | 8/2006 | Coulbourn, Jr. |
| 7,367,368 B2 |  | 5/2008 | Smitherman |
| 2009/0014251 A1 |  | 1/2009 | McCracken |

FOREIGN PATENT DOCUMENTS

WO    WO 2006000808 A2 *  1/2006

* cited by examiner

*Primary Examiner* — Shelley Self
*Assistant Examiner* — Matthew G Katcoff
(74) *Attorney, Agent, or Firm* — Hall Estill Attorney at Law

(57) ABSTRACT

A positioning system for attachment to a vehicle for operation of a power tool by a ground-based operator sitting in the vehicle provides a telescoping mast attached to the vehicle, a pivot bracket connecting an upper arm to the upper portion of the telescoping mast, mounting means for mounting the power tool on the upper arm; and power means for operating the power tool from the operator's position in the vehicle.

9 Claims, 22 Drawing Sheets

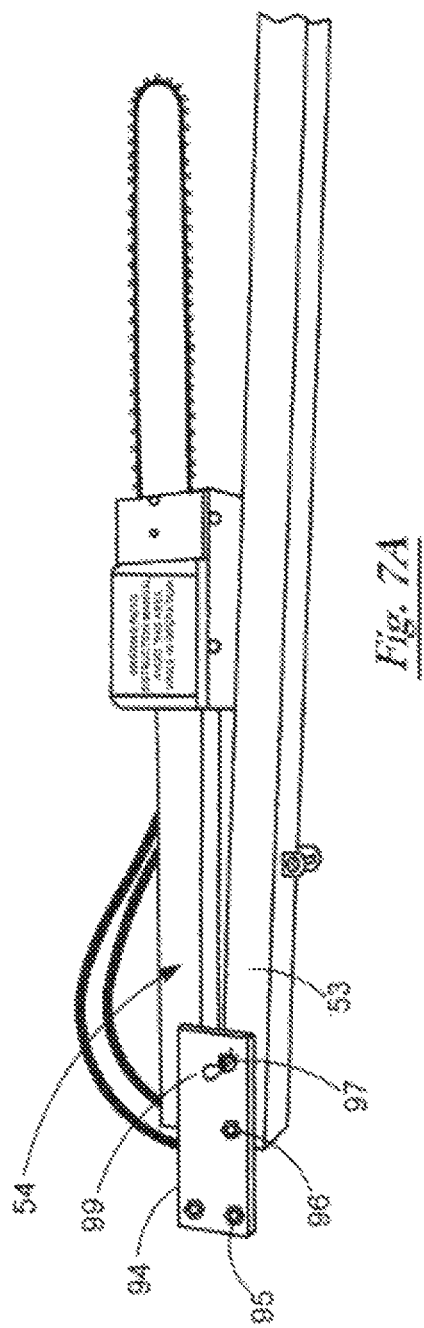

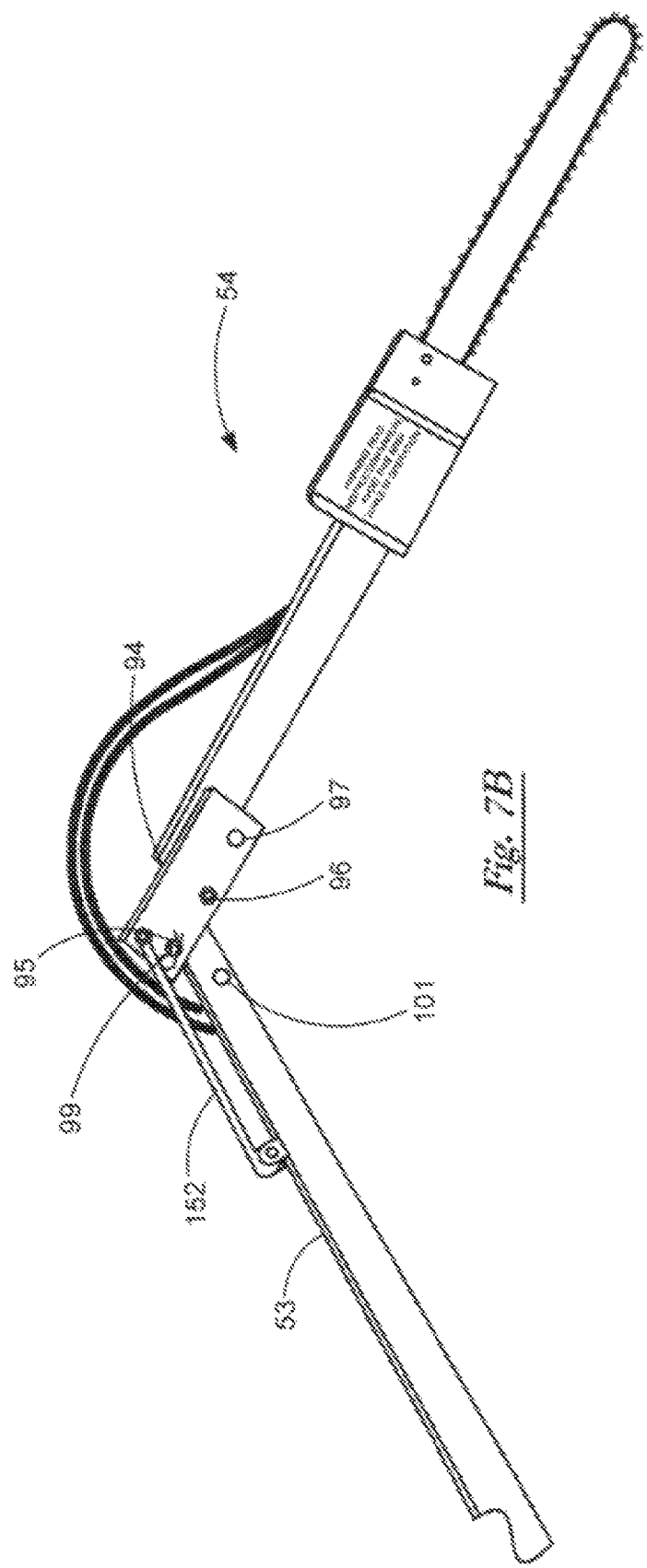

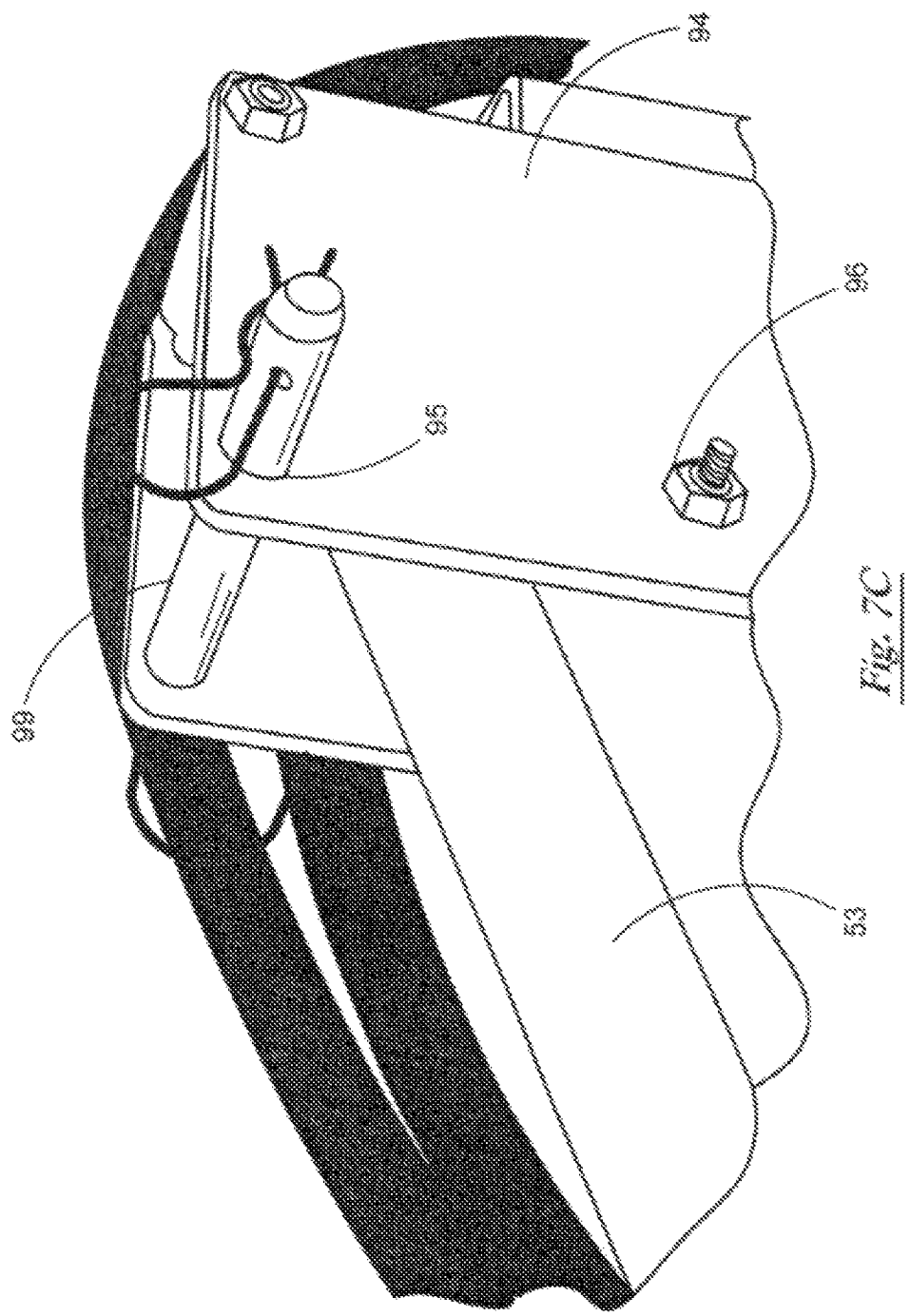

POSITIONING SYSTEM

RELATED APPLICATIONS

This is a continuing application that claims the benefit of the earlier filing date of application Ser. No. 11/827,485 filed on Jul. 11, 2007.

FIELD

The present embodiments relate generally to positioning a work article and more particularly, but without limitation, to operably positioning the work article at elevated work locations.

BACKGROUND

Tree limbs are typically removed by sawing, but most are located higher than what a person can reach with a hand-held saw while standing on the ground. In some previously attempted solutions the person with the saw is lifted by a device, such as a man-lift or a tractor bucket. That procedure is dangerous and usually requires two workers, one to control the lifting device and another to operate the saw. Another procedure even more dangerous is climbing the tree with the saw, such as by tying a rope to the saw and pulling it up to a perch in the tree. In other previously attempted solutions the person stands on the ground and raises a reciprocating saw attached to the end of a pole, commonly referred to as a "pole saw." However, the height and size of limb that can be cut with a pole saw is unacceptably limited.

Improvements are needed in the art that enable a person to safely and efficiently cut large tree limbs that are unreachable from the ground. It is to those improvements that the embodiments of the present invention are directed.

SUMMARY OF THE INVENTION

In some embodiments a positioning system attaches to a vehicle for operation of a power tool by a ground-based operator sitting in the vehicle. The positioning system has a telescoping mast that includes an upper portion and a lower portion. Attachment means attaches the lower portion of the telescoping mast to the vehicle. A pivot bracket connects an upper arm to the upper portion of the telescoping mast, the upper arm having a proximate end adjacent the pivot bracket and a distal end distal from the pivot bracket. Mounting means is provided to mount the power tool to the distal end of the upper arm. Power means is provided for operating the power tool from the operator's position in the vehicle.

In some embodiments an apparatus is provided that has a mast, and an arm joined to the mast by a pivot connection. A power tool is supported by the arm, and a flexible strap connects the arm to the mast to limit articulation of the arm in a first rotational direction when the flexible strap is taut.

In some embodiments an apparatus is provided that has a powered chain saw supported by an arm that is articulated around the end of an extension mast, and means for controlling the articulation of the arm that gives a visual indication of the suitability of a feed rate with which the powered chain saw is being operably advanced in cutting an article.

BRIEF DESCRIPTION OF THE DRAWINGS

FIG. 7A is similar to a portion of FIG. 7 but depicting a locking pin inserted to fix the positioning system in the folded position.

FIG. 7B depicts the locking pin inserted to provide a positive stop limiting the upward articulation of the saw.

FIG. 7C is an enlarged detail of the locking pin of FIG. 7B.

DETAILED DESCRIPTION

The embodiments of the present invention as described herein generally contemplate a positioning system for attachment to a vehicle for operation of a power tool by a ground-based operator in the vehicle. The positioning system contemplates enabling one person to operate the power tool remotely, such as at elevated location. The embodiments described are predominantly directed to the operation of a chain saw, although the contemplated embodiments are not so limited. Operating a chain saw properly requires presenting the cutting chain to the tree limb at a feed rate that is conducive to effective cutting. Either advancing the cutting chain too fast or too slow not only diminishes the cutting efficiency but also causes unnecessary wear and tear on the chain saw.

The skilled artisan knows that there is a tactile response that one gets from holding a chain saw while cutting that informs the operator as to the proper feed rate with which the chain saw should be advancing through the limb. Basically, if the chain saw is in proper mechanical condition then the operator essentially only needs to guide the direction of the cut, allowing the weight of the chain saw itself to establish the cutting feed rate. That tactile response is lost when using the chain saw when it is supported at the distal end of an extension pole. If the extension pole is operably guided by a lifting device, such as a tractor bucket, then it is easy to apply too much force in advancing the chain saw, causing damage to the chain saw or exceeding a hydraulic system pressure bypass limit. In some circumstances, exceeding the bypass limit can create a potentially dangerous condition by losing positioning control of a running chain saw. That could cause the saw to drop and contact a hazard or other object below.

Some embodiments discussed below are particularly directed to providing a visual indicator response to the operator that informs her that the proper feed rate is being applied by her lowering of the tractor bucket during cutting, in order to replace the lost tactile response.

Figure 1:
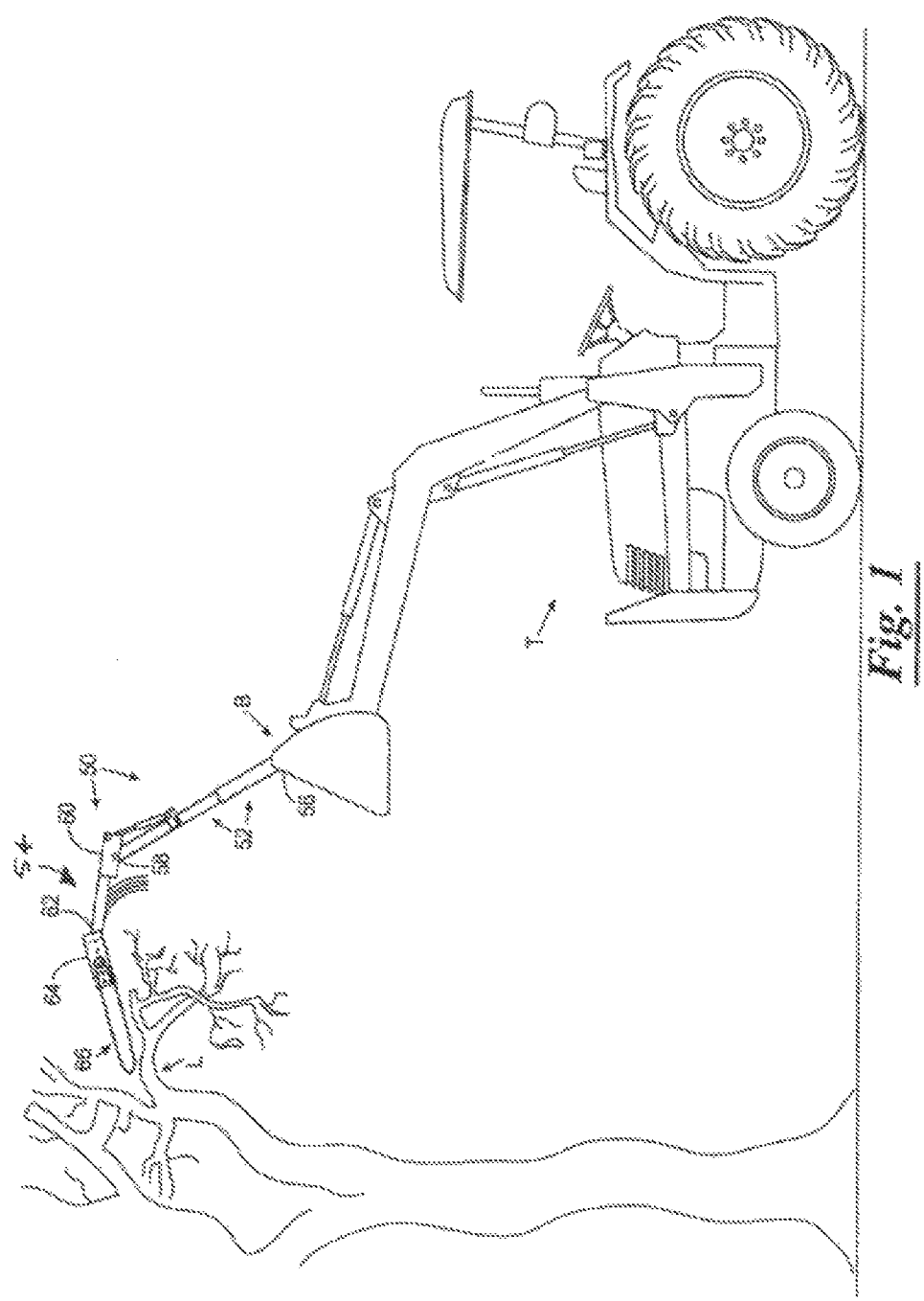
FIG. 1 depicts a positioning system constructed in accordance with the present embodiments and attached to a tractor.

Referring generally to the drawings and more particularly to FIG. 1, a positioning system 50 has a telescoping mast assembly 52 and an upper arm 54 supported by the telescoping mast assembly 52. The telescoping mast assembly 52 has a lower end portion 56 and an upper end portion 58. The lower end portion 56 is removably attachable to the bucket "B" of a tractor "T." The upper arm has a proximate end 60 and a distal end 62. The proximate end 60 of the upper arm 54 is pivotally attached to the upper end portion 58 of the telescoping mast assembly 52. A mounting plate 64 attached to the distal end 62 of the upper arm 54 by bolts 63, 65 (FIG. 2) supports a chain saw assembly 66. Thus, the tractor operator can raise the loader bucket B of the tractor T to position the chain saw assembly 66 above a tree limb L that has been selected for cutting, and then lower the bucket B to control the cutting feed rate of the chain saw.

Figure 2:
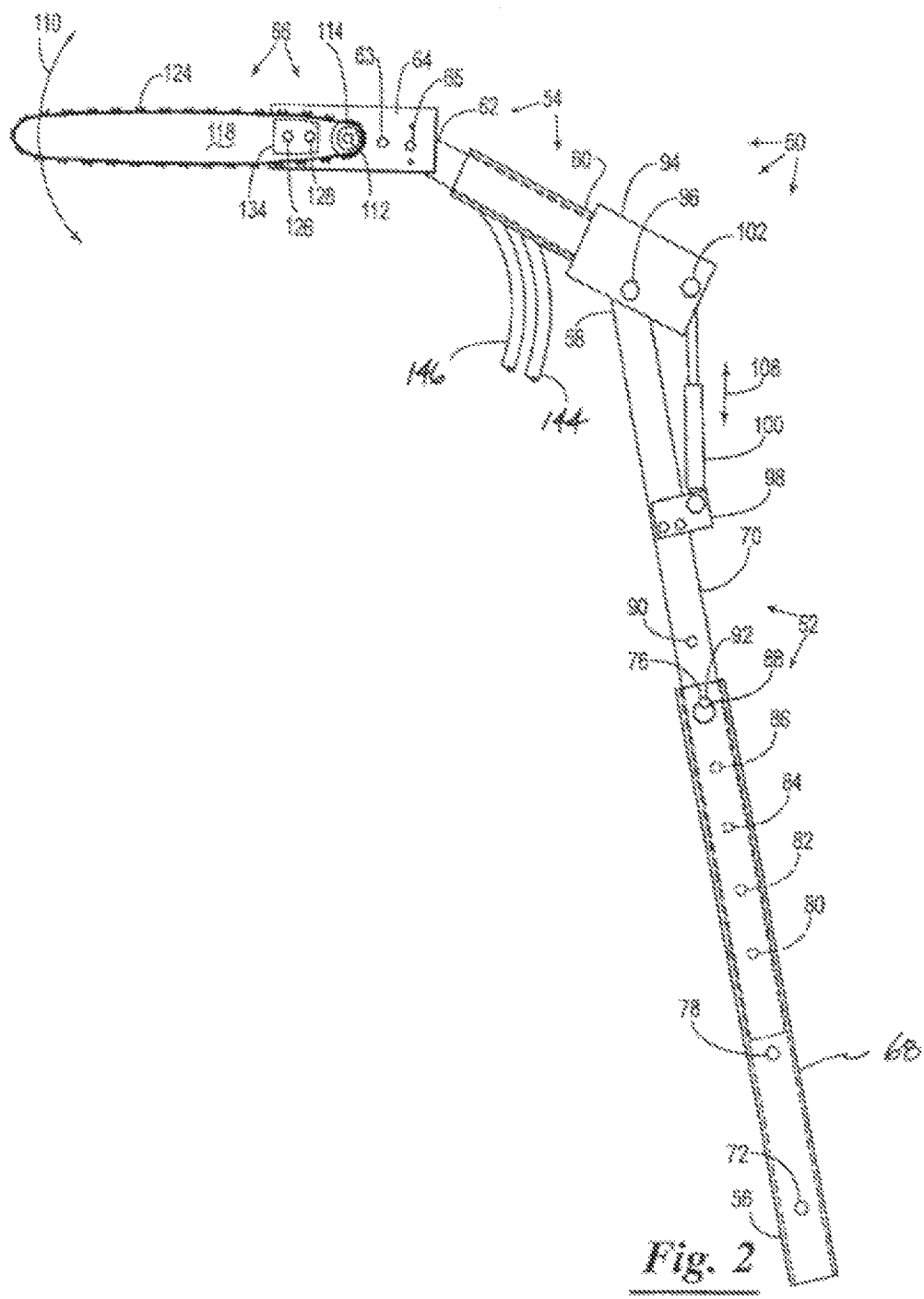
FIG. 2 is an enlarged depiction of the positioning system of FIG. 1.
Figure 4:
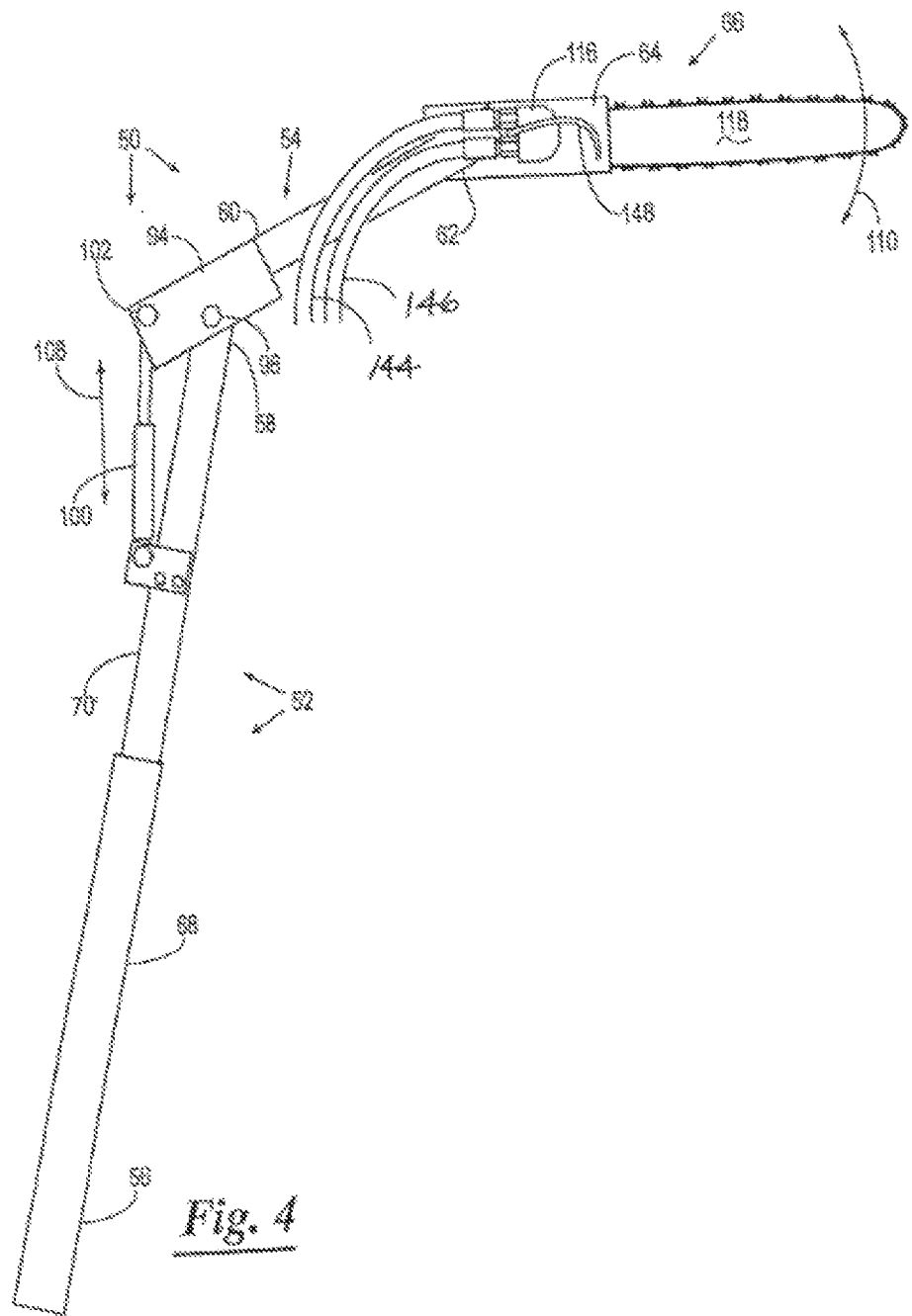
FIG. 4 depicts the opposing side of the positioning system of FIG. 2.

Referring now to FIGS. 2 and 4, the telescoping mast assembly 52 of the positioning system 50 consists of an outer mounting member 68 and a slidably extending inner member 70. Preferably, the outer mounting member 68 is constructed of square tubing, and the inner member 70 is constructed of and I-beam. Orienting the I-beam flanges of the inner member 70 to straddle the welded seam of the outer member 68 provides for an acceptable sliding engagement therebetween. The outer mounting member 68 has bores 72, 78 that are sized for passing bolts therethrough for attaching the outer mounting member 68 to the tractor bucket B.

Figure 2A:
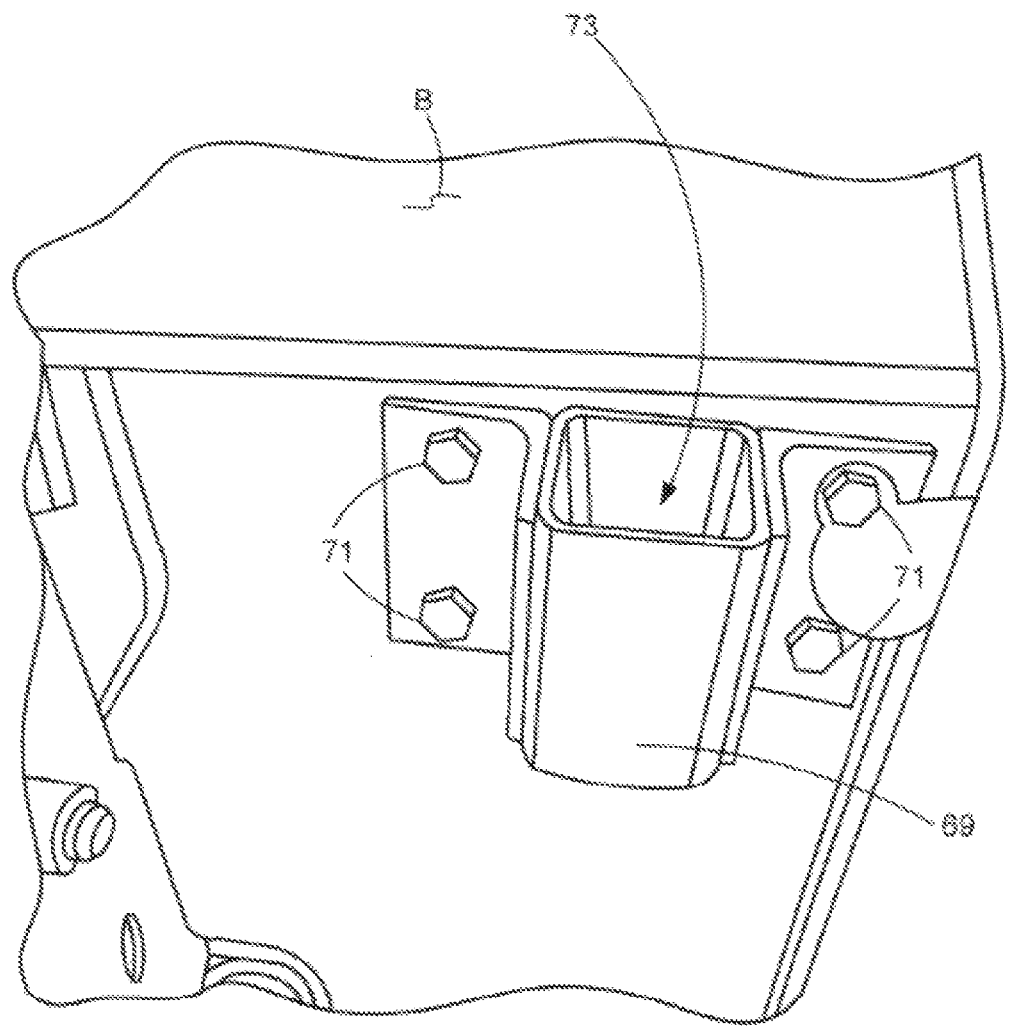
FIG. 2A depicts a receiver member attached to the bucket of the tractor for operably supporting the positioning system of the present embodiments.

Alternatively, FIG. 2A depicts a receiver member 69 attached to the tractor bucket B for a more convenient fastener-less attachment of the outer mounting member 68 to the tractor bucket B. The receiver member 69 is attached to the tractor bucket B with a plurality of fasteners 71, such as but not limited to the four-fastener pattern depicted. The receiver member 69 defines a passage 73 that is open on one end and sized to receivingly engage the outer mounting member 68. The passage 73 is closed on the other end (not shown) to limit the insertion depth. The receiver member 69 can thus advantageously be left in place on the tractor bucket B, and the outer mounting member 68 can then quickly be inserted into the receiver member 69 for operably supporting the positioning system 50. Preferably, the receiver member 69 is mounted to the tractor bucket B in an unobtrusive location, such to the backside of the tractor bucket B as depicted, so that it does not encumber other usage of the tractor.

Returning to FIG. 2, a locking pin bore 76 in the outer mounting member 68 is alignable with a selected one of a plurality of bores 80, 82, 84, 86, 88, 90 in the inner member 70. A locking pin 92 is depicted as being placed through the locking pin bore 76 and the bore 88 to fix the telescoping mast assembly 52 at a desired length.

Figure 2B:
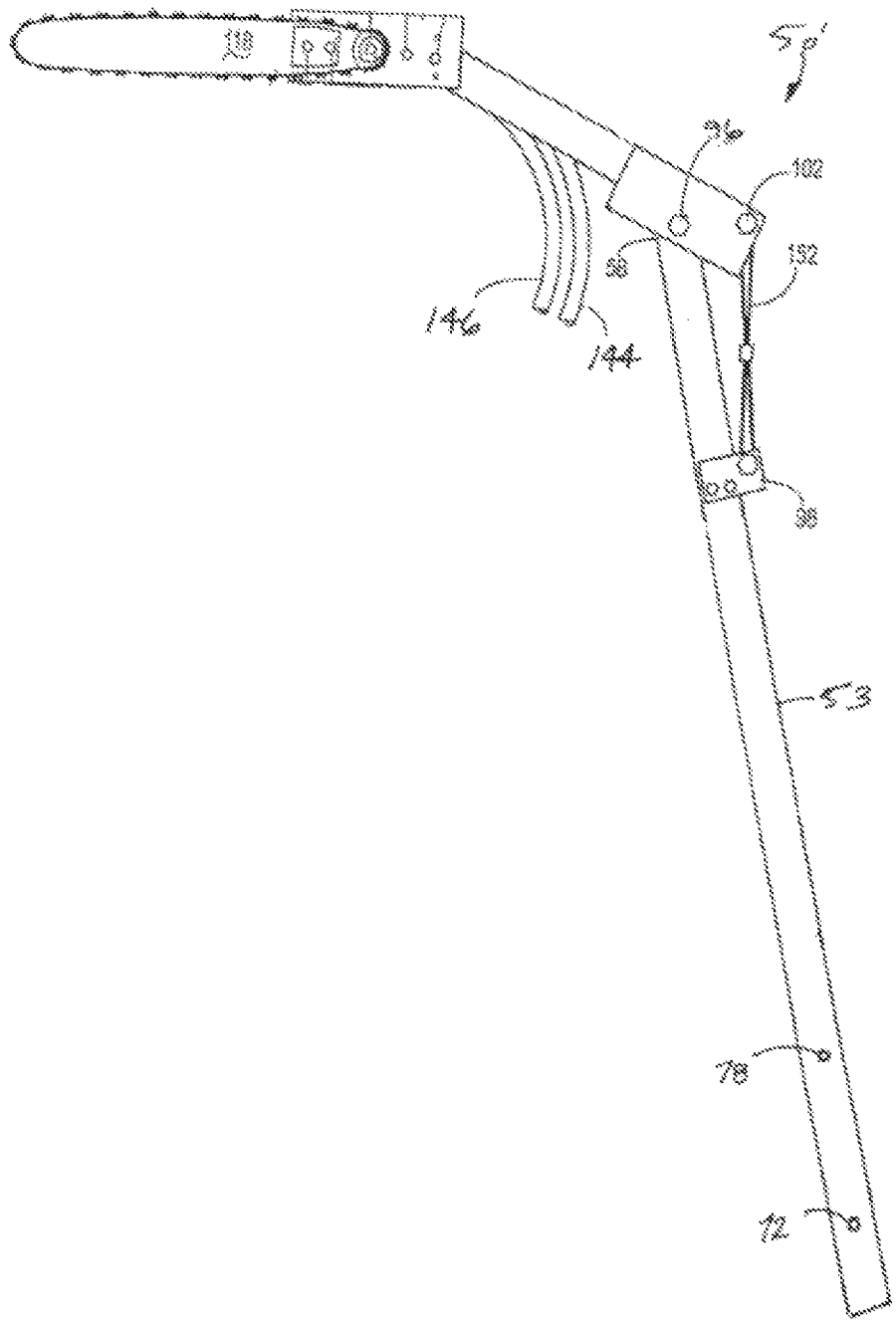
FIG. 2B is an enlarged depiction of a positioning system constructed in accordance with embodiments of the present invention.

FIG. 2B depicts another positioning system 50' that employs a solid unitarily constructed mast 53 instead of the telescoping mast assembly 52 of FIG. 2. Other modifications in the embodiments depicted in FIG. 2B are described below in reference to FIGS. 3 and 3A-3C.

Still referring to FIGS. 2 and 4, the proximate end 60 of the upper arm 54 is affixed to a pivot bracket 94 which is, in turn, pivotally attached to the upper end portion 58 of the telescoping mast assembly 52, such as by a pivot bolt 96. A mounting bracket 98 attached to the inner member 70 supports one end of an extensible cylinder 100, such as a hydraulic cylinder. The other end of the hydraulic cylinder 100 is attached to the pivot bracket 94, such as via a bolt 102. Hydraulic lines 104, 106 (FIG. 5) provide supply and return lines for operating the hydraulic cylinder 100. The linear movement of the hydraulic cylinder 100 articulates the chain saw assembly 66 along an arcuate path represented by the double-headed arrow and denoted by the reference number 110.

The embodiments depicted in FIG. 2 are illustrative and not limiting of the various contemplated ways of telescopingly adjusting the length of the telescoping mast assembly 52. In alternative equivalent embodiments, for example, a winch can be mounted to the lower end of the outer member 68 and aligned with a sheave mounted at the distal (upper) end of the outer member 68. A cable can be extended from the winch, trained around the sheave, and attached to the lower end of the inner member 70. Thus, the weight of the inner member 70 and the saw assembly 66 it supports is countered by the taut cable, which can be let out or taken up by the winch to lower and raise the inner member 70, respectively.

Still referring to FIGS. 2 and 4, the mounting plate 64 attached to the distal end 62 of the upper arm 54 supports the chain saw assembly 66. A chain drive sprocket 112 driven by an output shaft 114 of a hydraulic motor 116 is aligned with a chain bar 118 having elongated slots 120, 122 (FIG. 10) for tension adjustment. A cutting chain 124 having cutting elements incorporated therein is trained around the chain drive sprocket 112 and the chain bar 118. The chain bar 118 can be selectively positioned with respect to the chain drive sprocket 112 to impart a desired tension on the cutting chain 124. Bolts 126, 128 (FIG. 10) are tightened to hold a desired cutting chain tension. Hydraulic lines 144, 146 provide supply and return lines, respectively, from a hydraulic power source to turn the motor 116 and, in turn, rotate the output shaft 114. An oil line 148 provides gravity feed of oil from an oil reservoir (See FIG. 6) to the cutting chain 124.

Figure 3:
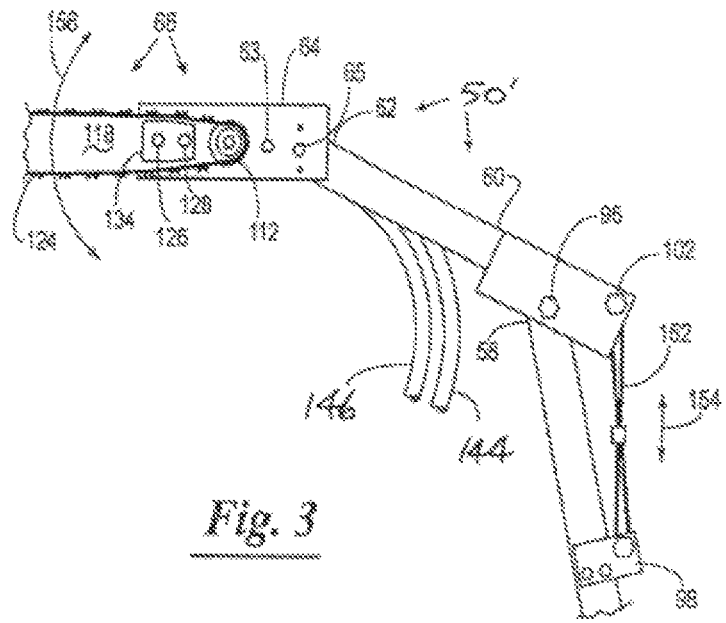
FIG. 3 depicts a portion of the positioning system of FIG. 2B.

FIG. 3 depicts embodiments of the present invention whereby the hydraulic cylinder 100 is replaced with a flexible strap 152 for controlling the articulation of the chain saw assembly 66. The strap 152 provides the user with a visual indicator of the correct feed rate at which the cutting chain 124 is being presented to the tree limb being cut, as described in detail below. Because the strap functions as a visual indicator, it is preferably constructed from a high-visibility colored material, such as yellow or orange. The strap 152 can be constructed of a suitably strong material such as a nylon fabric, or alternatively constructed of materials such as but not limited to cable or chain.

The optimal feedrate for presenting the cutting chain 124 to the tree limb is provided by the force of gravity alone acting on the weight of the chain saw assembly 66 and the supporting structure of the upper arm 54. However, the user loses all tactile sensation during the cutting action by virtue of the chain saw assembly 66 being remotely supported at the distal end of the positioning system 50. FIG. 3 depicts the resting, inoperable position of the chain saw assembly 66, where the full weight of the chain saw assembly 66 and upper arm 54 urges the cutting chain 124 downward (as viewed in FIG. 3) and as such the strap 152 is taut. This is the state of the strap 152 that the user would expect to see while moving the bucket B to initially position the chain saw assembly 66 over and then downwardly toward the tree limb that is going to be cut.

Figure 3A:
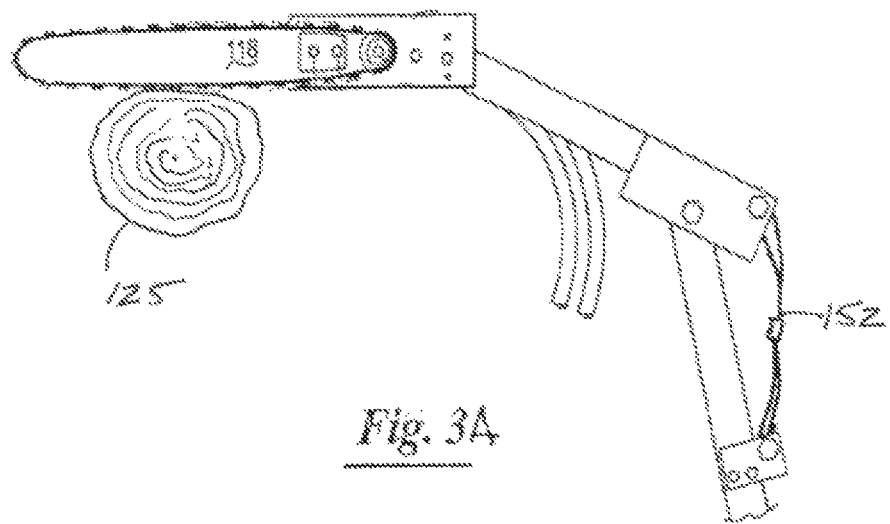
FIG. 3A is similar to FIG. 3 but depicting the saw making initial contact with the limb.

The operator monitors the taut state of the strap 152 while lowering the tractor bucket B to advance the cutting chain 124 toward the tree limb 125. FIG. 3A depicts a visual indicator provided by the strap 152 at the moment that contact is made with the tree limb. Particularly, at that moment the visual indication of the strap 152 changes from being taut to being just slightly slack. This transition of the strap 152 visual indicator is effectively magnified if there is any wind present, because in a mild wind the taut strap 152 of FIG. 3 remains rigid whereas the slightly slack strap of FIG. 3A will flap slightly in the wind. Even without the aid of wind, however, this first visual indication from taut to slightly slack is clearly noticeable when the strap 152 loses its rigid form that is characteristic of the taut state.

Figure 3B:
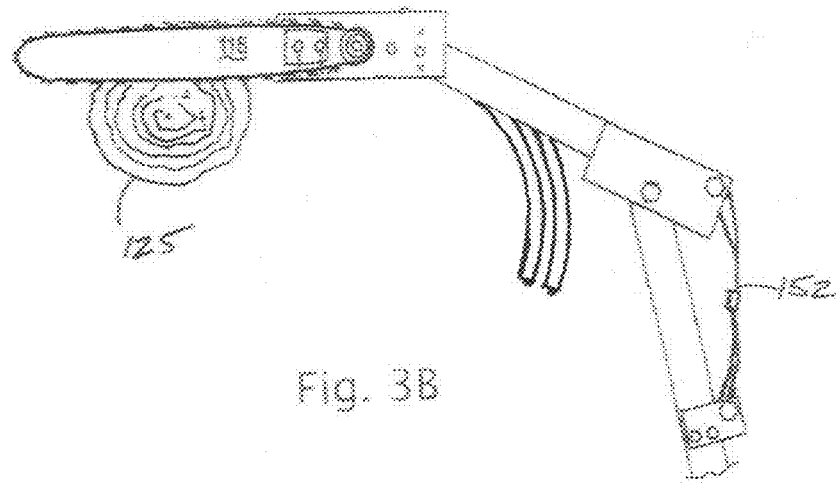
FIG. 3B is similar to FIG. 3A but depicting the saw cutting at a proper feed rate.
Figure 3C:
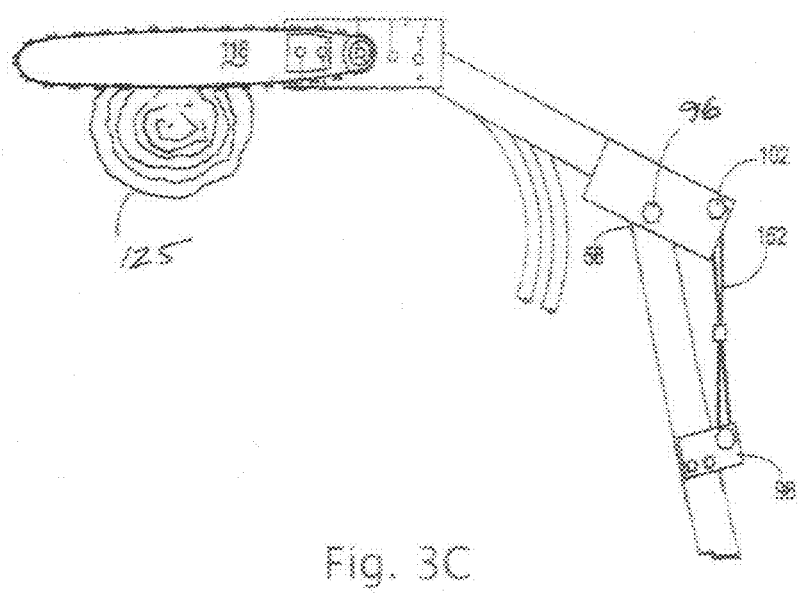
FIG. 3C is similar to FIG. 3A but depicting the saw cutting at too slow of a feed rate.

Once contact is made, the operator then aims to lower the tractor bucket B at a rate that maintains the slightly slack state of the strap 152 as the cutting chain 124 progressively cuts through the tree limb 125, as depicted in FIG. 3B. That is, if after beginning to cut into the tree limb 125 the strap 152 goes taut again, as depicted by FIG. 3C, then that is a visual indication that the bucket B speed is too slow because the cutting chain 124 has presently cut away all the tree limb material under it; hence, the cutting action is starved because feedrate is too slow.

Figure 3D:
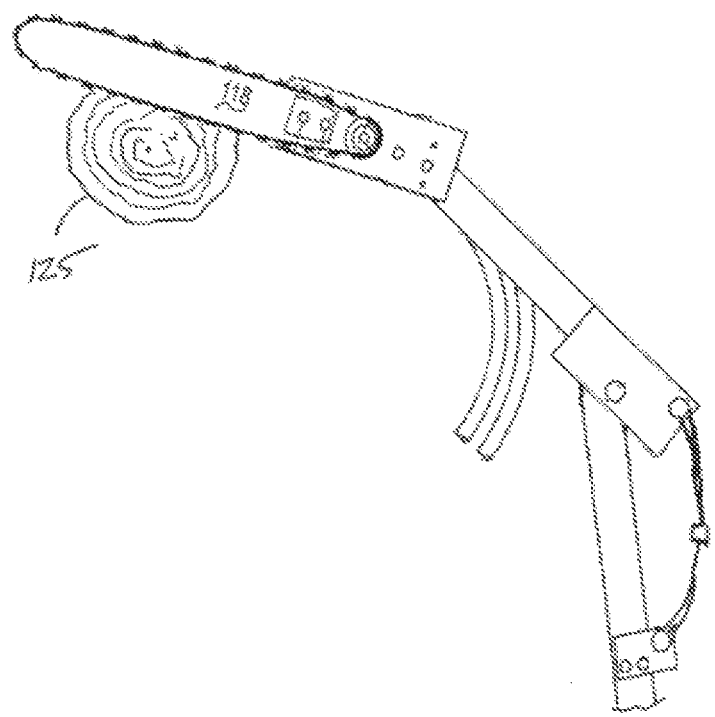
FIG. 3D is similar to FIG. 3A but depicting the saw cutting at too fast of a feed rate.

However, on the other hand if the tractor bucket B is being lowered too fast then the visual indication of the strap 152 will change from being just slightly slack to being highly slack, as depicted in FIG. 3D. A highly slack strap 152 essentially hangs limp and assumes a pronounced arcuate shape in the lack of wind, and in a wind noticeably flaps more than in the slightly slack state. The highly slack state indicates that the downward force acting on the cutting chain 124 is greater than that provided merely by the weight of the chain saw assembly 66 and upper arm 54; the cutting action is overwhelmed because the feedrate is too fast.

Figure 5:
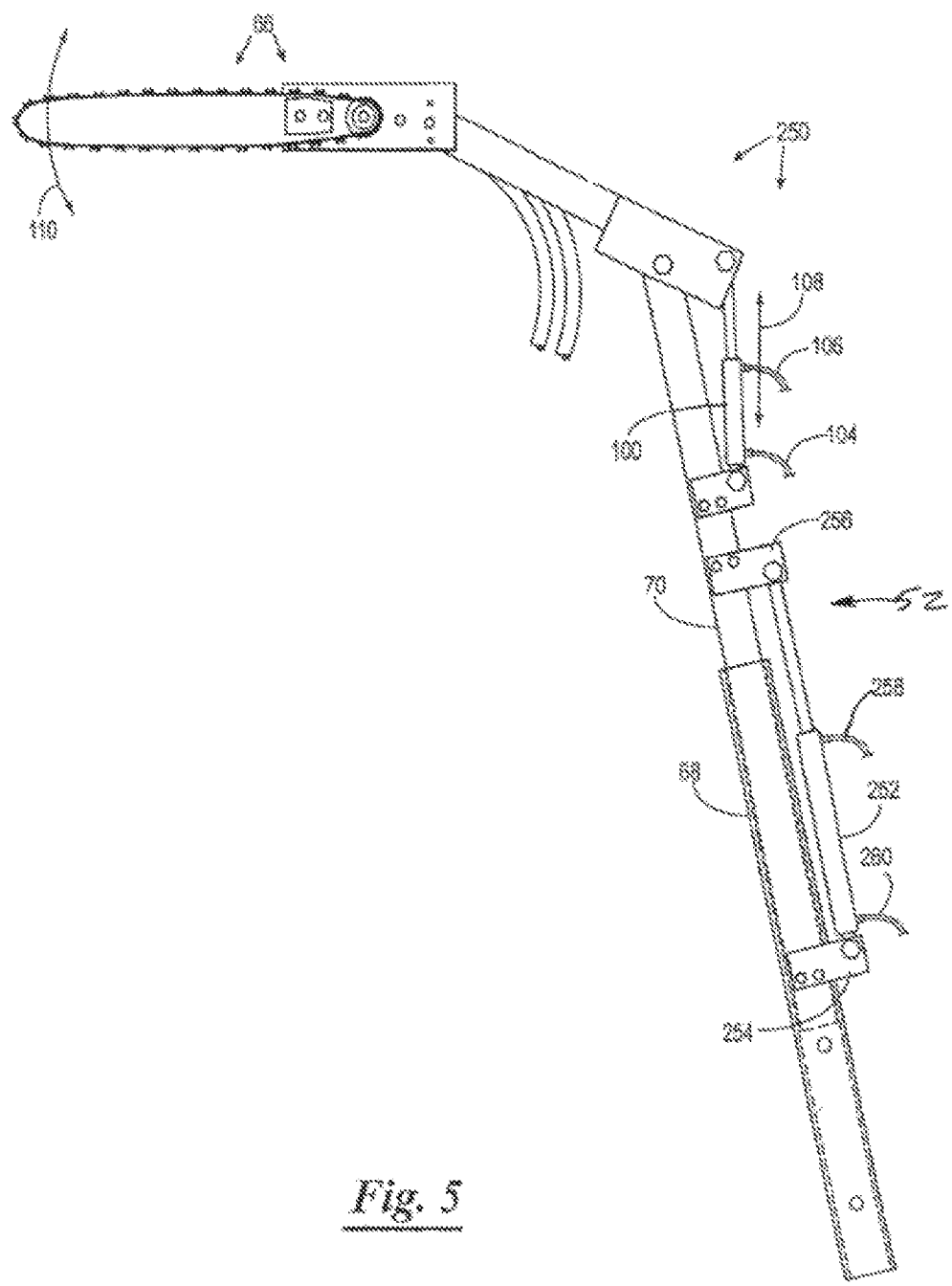
FIG. 5 depicts a positioning system that is constructed in accordance with embodiments of the present invention.

Referring now to FIG. 5, another positioning system 250 according to the present embodiments includes a telescoping mast hydraulic cylinder 252 attached at one end to a bracket 254 that is, in turn, attached to the outer mounting member 68 of the telescoping mast assembly 52. The other end of the hydraulic cylinder 252 is attached to a bracket 256 that is, in turn, attached to the slidably extendable inner member 70 of the telescoping mast assembly 52. Hydraulic lines 258, 260 connect the hydraulic cylinder 252 to a hydraulic power source (not shown) such as from the tractor T. The positioning system 250 shown in FIG. 5 permits hydraulic control of both the length of the telescoping mast assembly 52, by positioning the hydraulic cylinder 252, and of articulation of the chain saw assembly 66, by positioning the hydraulic cylinder 100. Preferably, the hydraulics system powering the hydraulic cylinder 252 can provide the necessary pressure and then hold that pressure to maintain a corresponding desired length of the telescoping mast assembly 52 without the use of a locking pin 92 (FIG. 2).

Figure 6:
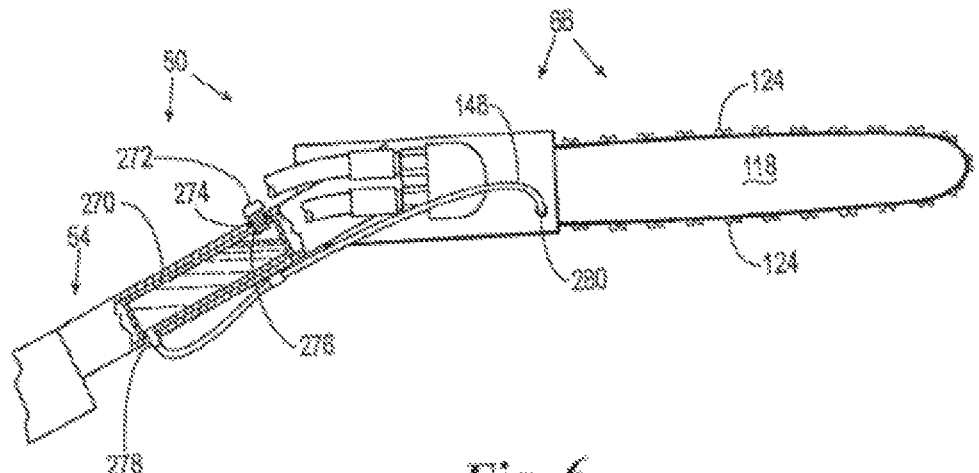
FIG. 6 is a partially cut away depiction of the upper arm of the positioning system of FIG. 4.

Referring now to FIG. 6, in these illustrative embodiments the upper arm 54 of the positioning system 50 can contain an oil reservoir 270. A vented cap 272 extends through a bore 274 in the upper arm 54 to engage a bore 276 in the oil reservoir 270. A fitting 278 in the oil reservoir 270 fluidly communicates oil from the oil reservoir 270 to the oil line 148, and the oil flows through the oil line 148 to another fitting 280 that operably delivers the oil to the cutting chain 124.

In this manner, the oil from the oil reservoir 270 is gravity fed through the oil line 148 when the chain saw assembly 66 articulates downwardly while cutting the tree limb L, as depicted in FIG. 1. The oil reservoir 270 can be secured within the upper arm 54 by its connection to the cap 272. The cap 272 has a removable cover to permit filling the oil reservoir 270 while it remains secured inside the upper arm 54. Although the illustrative embodiments depict the upper arm 54 and the chain oil reservoir 270 both having a square cross-section, the present embodiments are not so limited.

Figure 6A:
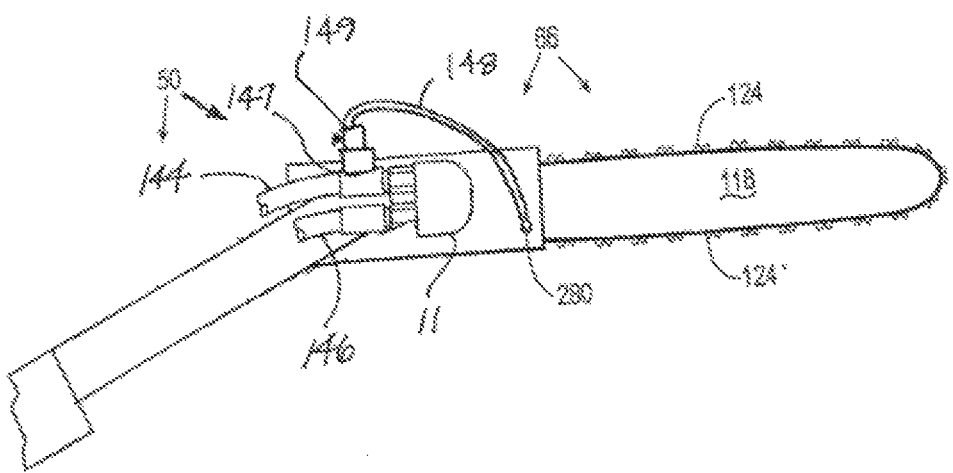
FIG. 6a is similar to FIG. 6 but depicting a lubrication system that diverts a portion of the hydraulic fluid to lubricate the chain bar and the cutting chain.

Alternatively, FIG. 6A depicts embodiments wherein the oil line 148 is connected to the hydraulic supply line 144. A three-way fitting 147 connects the supply line 144 to the motor 116. A flow control valve 149 is also connected to the three-way fitting 147 to fluidly communicate a portion of the supply-side hydraulic fluid to the oil line 148 for lubricating the chain bar 118 and the cutting chain 124. Preferably, the flow control valve 149 is adjustable, such as a needle valve, for delivering a selected amount of lubrication. The flow control valve 149 also preferably has a check valve component to it to prevent loss of hydraulic fluid when the saw is not being operated. A valve that has been used successfully is one manufactured by Alkon Corporation of Fremont, Ohio, and marketed as model JF2.

Figure 7:
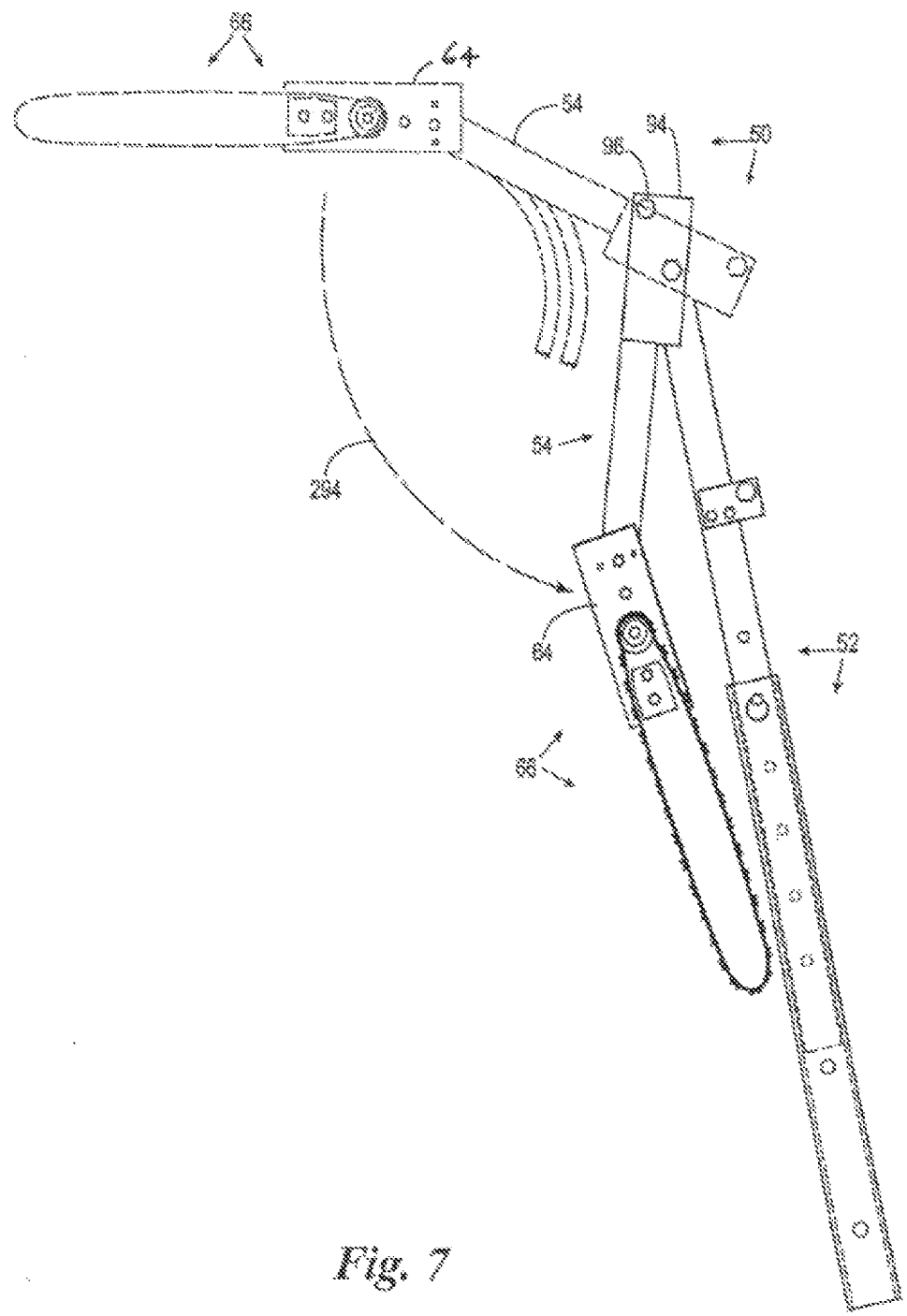
FIG. 7 depicts the positioning system of FIGS. 1-6 wherein the upper arm is moveable between an operable position depicted in broken lines and an inoperable folded position for safe transit depicted in solid lines.

Referring now to FIG. 7, detachment of the hydraulic cylinder 100 of the positioning system 50, 250, or disconnection of one end of the limit strap 152 of the positioning system 50', permits the upper arm 54 to pivot on the pivot bolt 96 so the upper arm 54, the mounting plate 64, and the saw assembly 66 can articulate along an arc 294 between an extended use position (shown in phantom) and a folded storage position.

FIG. 7A is an enlarged view of a folded positioning system 50' similar to that depicted in FIG. 7 but having two holes 95, 97 in the pivot bracket 94 that are sized to receive a locking pin 99. In the folded arrangement depicted, the hole 97 aligns with another hole 101 (FIG. 7B) in the mast 53 so that insertion of the locking pin 99 affixes the mast 53 and the arm 54 together.

In FIG. 7B the locking pin 99 has been removed from the hole 97 and inserted in the other hole 95. The strap 152 is connected to support the upper arm 54 in an operable position. FIG. 7C best depicts how the locking pin 99 in the hole 95 provides a positive stop that abuttingly engages against the mast 53 to limit the upward articulation of the upper arm 54.

Figure 8:
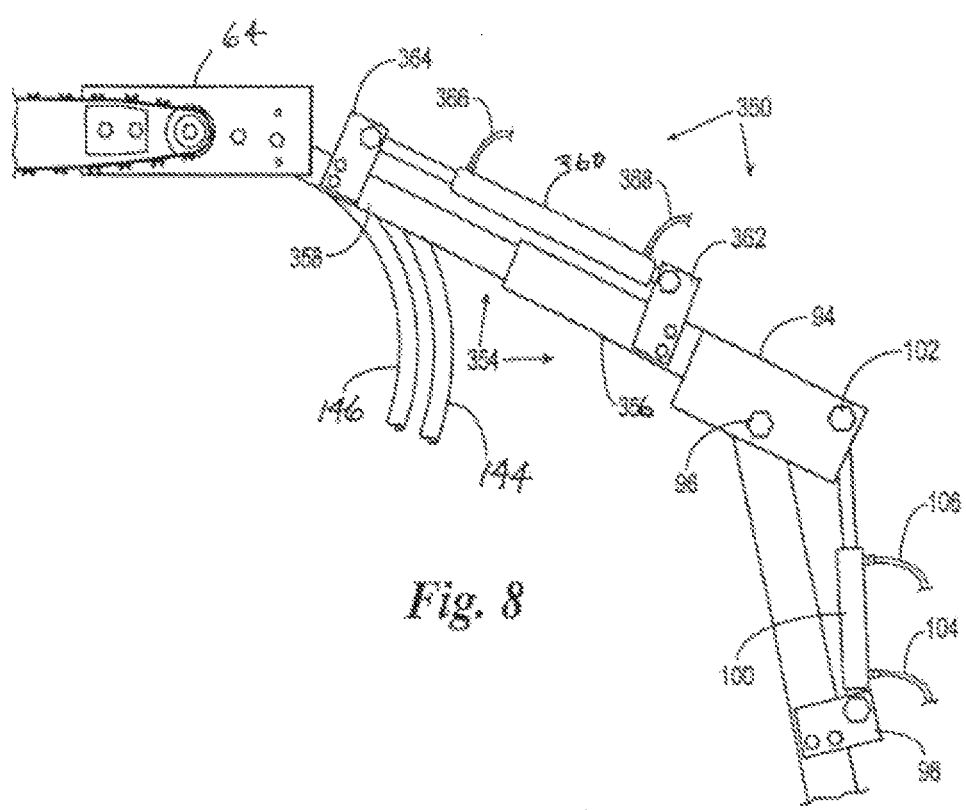
FIG. 8 depicts a positioning system that is constructed in accordance with embodiments of the present invention.

Referring now to FIG. 8, another positioning system 350 has a telescoping upper arm 354 consisting of a telescoping upper arm outer member 356 and a slidably extending inner member 358 for selectively lengthening the upper arm 354. A hydraulic cylinder 360 is attached at one end to a bracket 362 on the outer member 356. The other end of the hydraulic cylinder 360 is attached to a bracket 364 on the slidably extending inner member 358. Hydraulic lines 366, 368 connect the hydraulic cylinder 360 to a hydraulic power source (not shown) such as from the tractor T.

Figure 9:
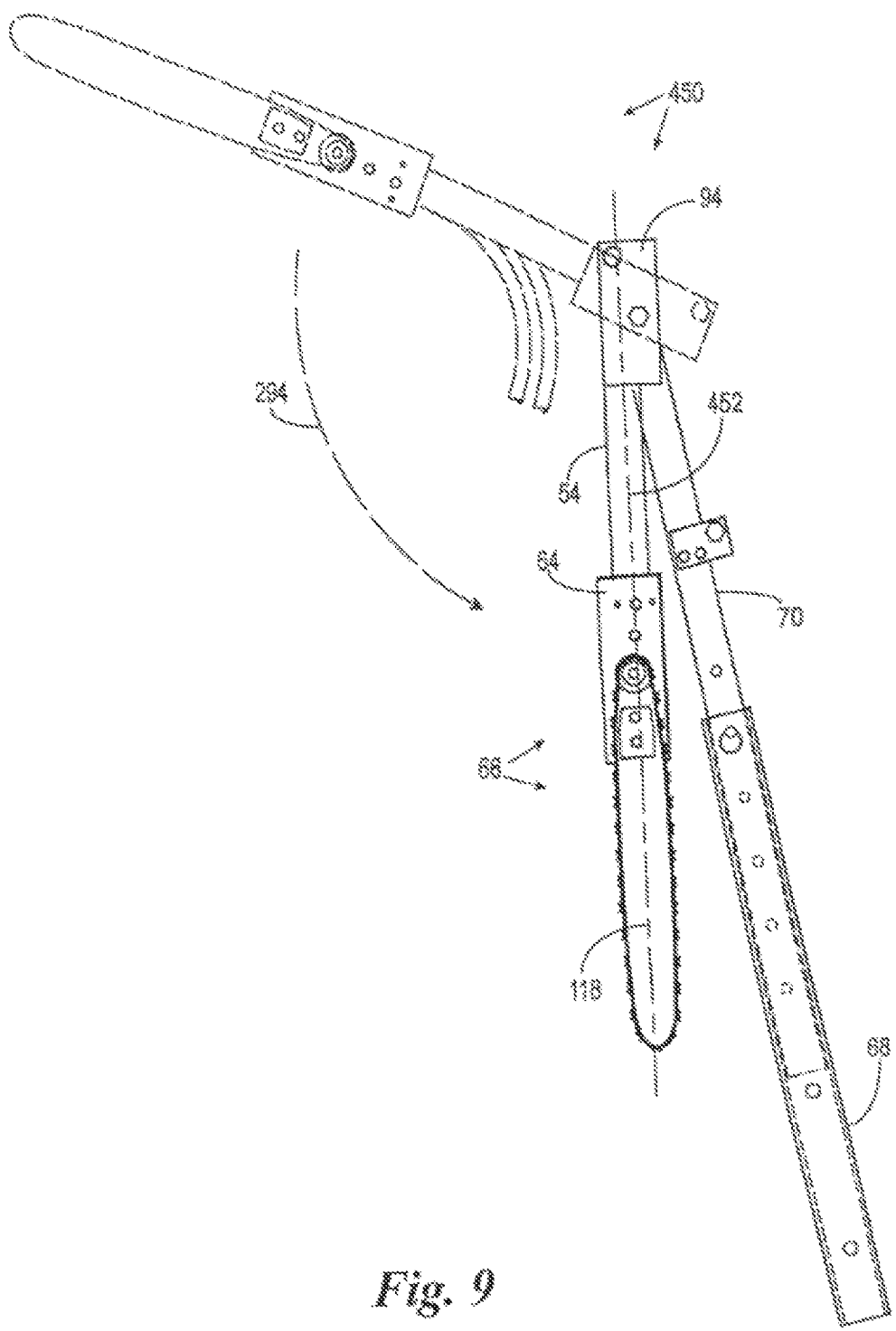
FIG. 9 depicts a positioning system similar to that depicted in FIG. 7 but constructed in accordance with other embodiments of the present invention.

Referring now to FIG. 9, another positioning system 450 is similar to the positioning system 50 shown in FIG. 7 except for a longitudinally aligned orientation of the pivot bracket 94, the upper arm 54, the mounting plate 64, and the chain bar 118 along a common longitudinal axis 452. This permits a more compact folded arrangement.

Figure 10:
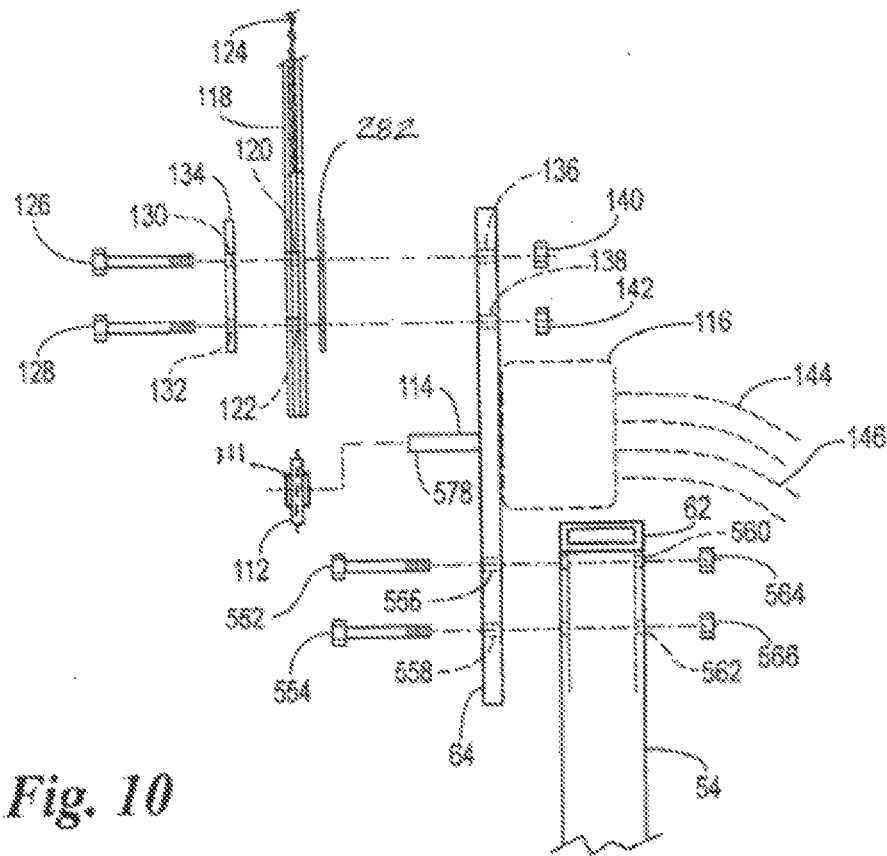
FIG. 10 is an exploded depiction of portions of the operable attachment of the chain saw to the upper bar.
Figure 11:
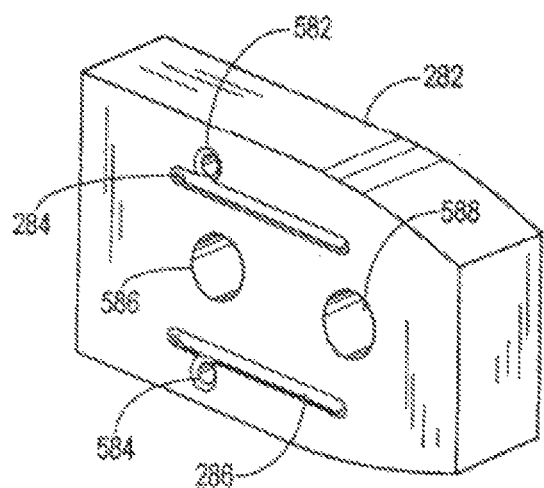
FIG. 11 depicts an enlarged view of a spacer block with oiling grooves.
Figure 12:
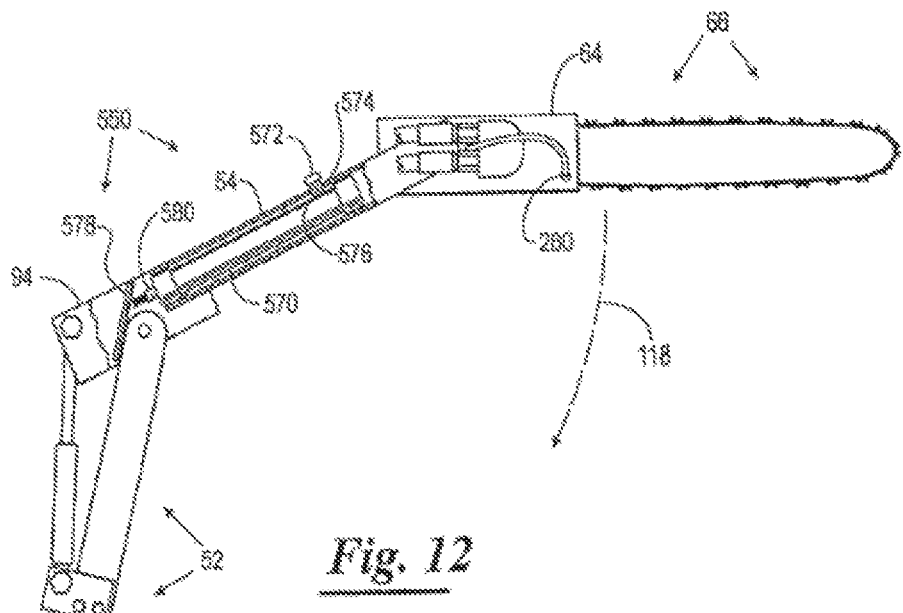
FIG. 12 depicts a positioning system that is constructed in accordance with embodiments of the present invention.

Referring now to FIGS. 10 and 11, the mounting plate 64 is attached near the distal end 62 of the upper arm 54 by bolts 552, 554 disposed through bores 556, 558, respectively in the mounting plate 64, through bores 560, 562, respectively near the distal end of the upper arm 54, and secured by nuts 564, 566, respectively. As previously discussed, the mounting plate 64 is thus attached to the distal end 62 of the upper arm 54 and supports, in turn, the chain saw assembly 66.

Figure 10A:
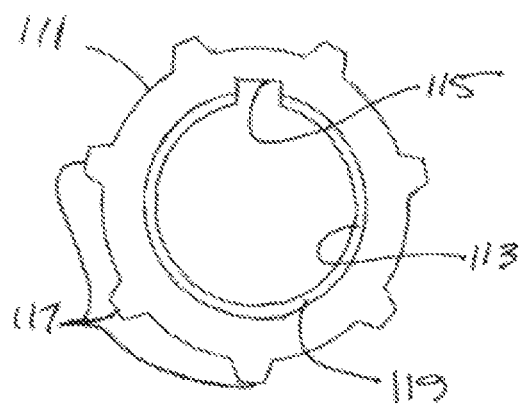
FIG. 10A depicts an elevational view of the shaft adapter that mounts to the motor output shaft and operably supports the chain drive sprocket of FIG. 10.
Figure 10B:
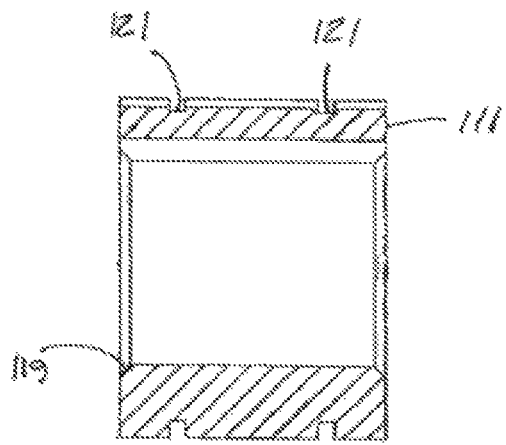
FIG. 10B depicts a cross sectional view of the shaft adapter of FIG. 10A.

FIGS. 10A and 10B depict side and cross sectional views, respectively, of a shaft adapter 111 that is constructed in accordance with embodiments of the present invention. The shaft adapter 111 mounts directly to the output shaft 114 of the motor 116, and drivingly engages a chain drive sprocket 112 (FIG. 10) that engages and drives the cutting chain 124. The shaft adapter 111 defines a bore 113 and keyway 115 that cooperatively form a close mating relationship with the keyed output shaft 114 (FIG. 10) of the motor 116. A number of spaced protuberant teeth 117 circumscribing the outer surface are sized and spaced to matingly engage a spline pattern defined in a mounting bore of the chain drive sprocket 112. A chamfer 119 is formed at both ends of the bore 113 to enhance the penetration of a weld that is used to attach the shaft adapter 111 to the shaft 114. A pair of slots 121 circumscribe the teeth 117 and are each sized to operably receive a snap ring.

The shaft adapter 111 is keyed and welded to the motor shaft 114 and, in turn, drives the chain drive sprocket 112 via an engagement therewith the teeth 117. This eliminates any need for a set screw attachment, which can vibrate loose during cutting. The chain bar 118 (FIG. 10) has a peripheral edge that defines a slot sized to retain the cutting chain 124 as it is rotated. The chain drive sprocket 112 is operably captured between the snap rings supported in the slots 121 to maintain its alignment with the cutting chain 124. Preferably, the shaft adapter 111 is mounted on the shaft 114 so as to align the center of the spacing between the slots 121 with the peripheral edge of the chain bar 118.

In the manner described above, the chain drive sprocket 112 is driven by the shaft 114 of the hydraulic motor 116, and is aligned with the chain bar 118 having elongated slots 120, 122 for adjusting the tension of the cutting chain 124. The chain drive sprocket 112, in turn, drives the cutting chain 124. The position of the chain blade 118 with respect to the chain drive sprocket 112 determines the tension on the chain 124. Bolts 126, 128 extending through bores 130, 132 in the locking plate 134, through the elongated slots 120, 122 in the chain bar 118, and through bores 136, 138 in the mounting plate 64 are secured by nuts 140, 142. Hydraulic lines 144, 146 connect the hydraulic motor 116 to a hydraulic power source (not shown) such as from the tractor T.

Still referring to FIGS. 10 and 11, the spacer 282 is held between the chain bar 118 and the mounting plate 64 by bolts 126, 128 secured in place by nuts 140, 142, respectively. The spacer 282 includes oiling channels 284, 286 on one side and like oiling channels (not shown) on the other side. The oiling channels 284, 286 communicate chain oil from the fitting 280 (FIG. 6) to the chain bar 118 and the cutting chain 124. Bores 582, 584 in the spacer 282 fluidly connect oiling channels on opposite sides of the spacer 282. Bores 586, 588 receive bolts 126, 128, respectively for attachment of the chain bar 118 to the mounting plate 64.

Referring now to FIGS. 12-15, another positioning system 550 according to the present embodiments includes an oil reservoir 570 within the upper arm 54. An unvented cap 572 extends through a bore 574 in the upper arm 54 to engage a bore 576 in the oil reservoir 570. A pump assembly 580 automatically pumps oil from the oil reservoir 570 to the fitting 280 each time the chain saw assembly 66 is articulated downwardly. An actuating member 578 attached to the upper end of the telescoping mast assembly 52 contacts a spring-biased open piston 582 in fluid communication with a cylinder 583. A suction check valve 584 fluidly connecting the cylinder 583 to the oil reservoir 570 prevents oil from flowing from the cylinder 583 into the oil reservoir 570, while a discharge check valve 586 permits oil to flow through the oil line 148 to the fitting 280.

Figure 13:
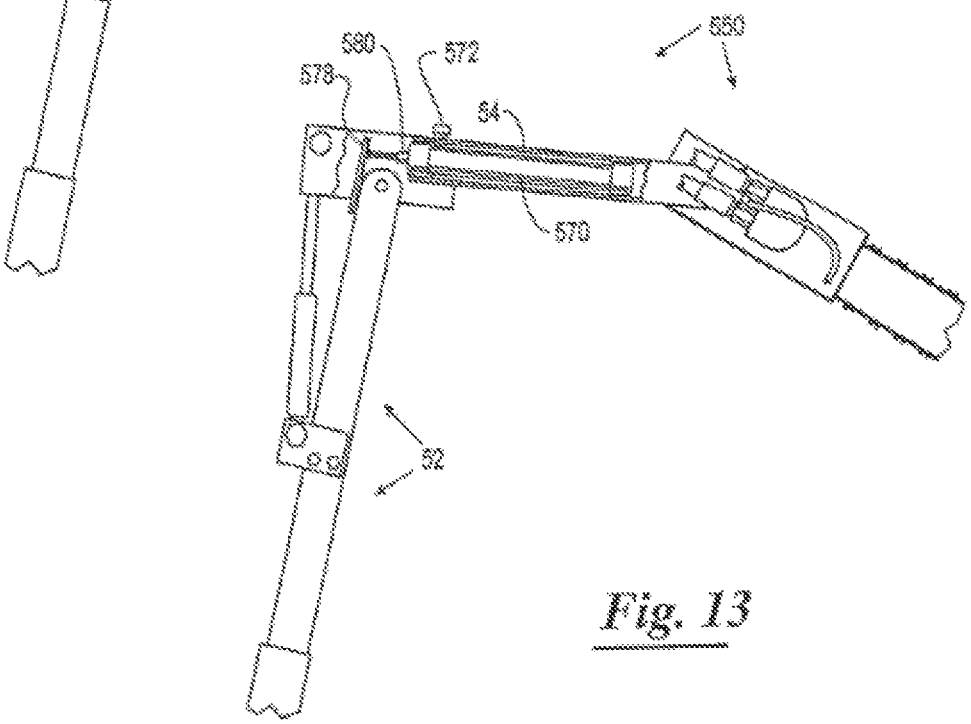
FIG. 13 depicts the positioning system of FIG. 12 at a different operable position.
Figure 14:
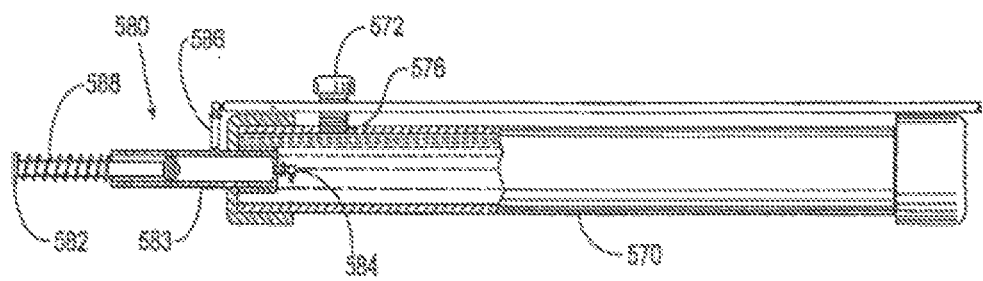
FIG. 14 depicts a detailed enlarged view of the automatic oiler in the positioning system of FIGS. 12-13.
Figure 15:
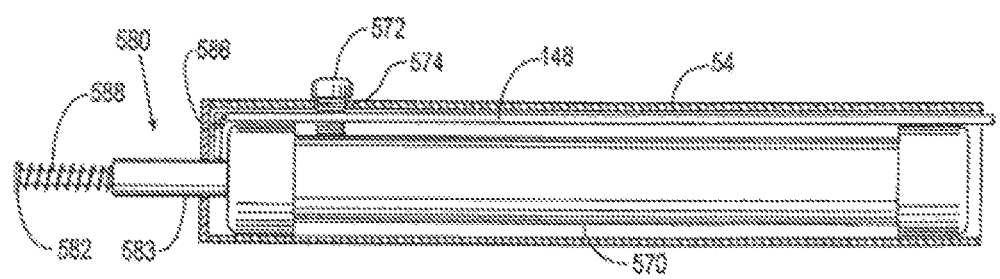
FIG. 15 depicts another view of the automatic oiler in the positioning system of FIGS. 12-13.

Still referring to FIGS. 12-15 and more particularly to FIG. 13, when the force on the actuating member 578 is relieved, a spring 588 affects a suction stroke. Chain oil is prevented from flowing back through the discharge check valve 586 into the cylinder 583, so chain oil is drawn into the cylinder 583 through the suction check valve 584. When the upper arm 54 is once again articulated downwardly, the pump assembly 580 once again delivers oil to the fitting 280.

Although in the foregoing illustrative embodiments the chain saw assembly 66 is powered by a hydraulic motor, in alternative equivalent embodiments the chain saw assembly 66 can be powered by other power plants such as but not limited to a pneumatic motor and an electric motor. Similarly, pneumatic positioners can be used in place of the hydraulic cylinders 100, 252 in alternative equivalent embodiments of the present invention.

Figure 16:
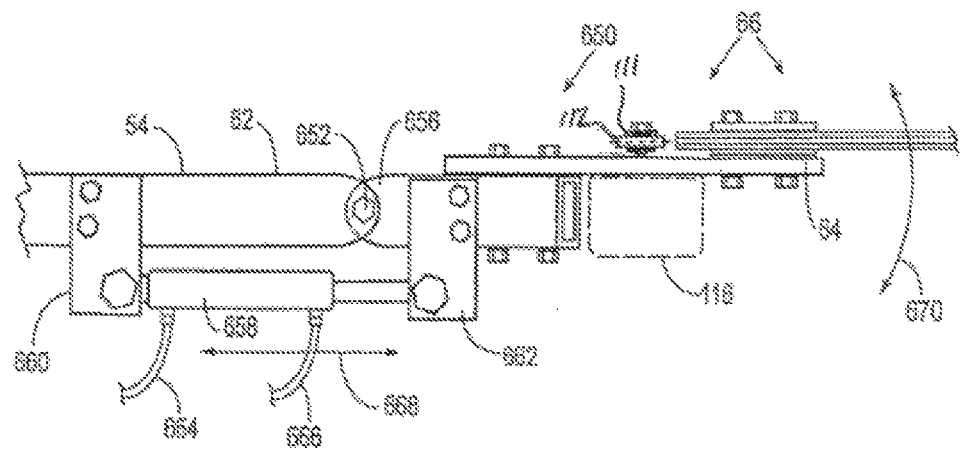
FIG. 16 depicts a positioning system that is constructed with upper arm lateral pivotal movement in accordance with embodiments of the present invention.

Referring now to FIG. 16, a top view of another positioning system 650 has a vertical pivot bolt 652 operably disposed in vertical bores near the distal end 62 of the upper arm 54 and through aligned vertical bores in mating horizontal tabs 656 secured to the mounting plate 64. A hydraulic cylinder 658 is attached on one end to a bracket 660 on the upper arm 54 and on the other end to a bracket 662 on one of the horizontal tabs 656. Hydraulic lines 664, 666 connect the hydraulic cylinder 658 to a hydraulic power source (not shown) such as from the tractor T. Linear extension of the hydraulic cylinder 658 along reference direction 668 causes the mounting plate 64 and, in turn, the chain saw assembly 66 to articulate laterally along the reference arrow 670.

Figure 17:
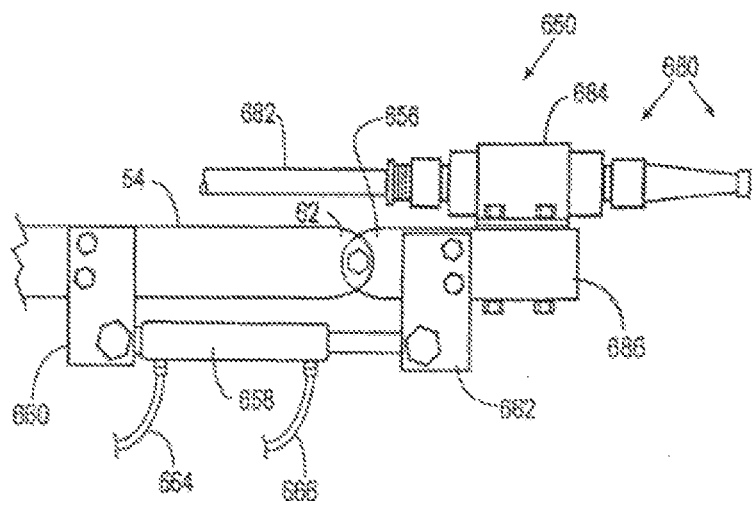
FIG. 17 depicts a nozzle mounted on the end of the upper arm.

Referring now to FIG. 17, the positioning system 650 shown in FIG. 16 provides positioning of a nozzle assembly 680 connected to a supply hose 682. The supply hose 682 may provide air for thinning fruit, an appropriate chemical mixture for spraying trees and other plant life, or paint for use on difficult-to-reach locations. A collar 684 secures the nozzle assembly 680 to an adaptor 686.

Figure 18:
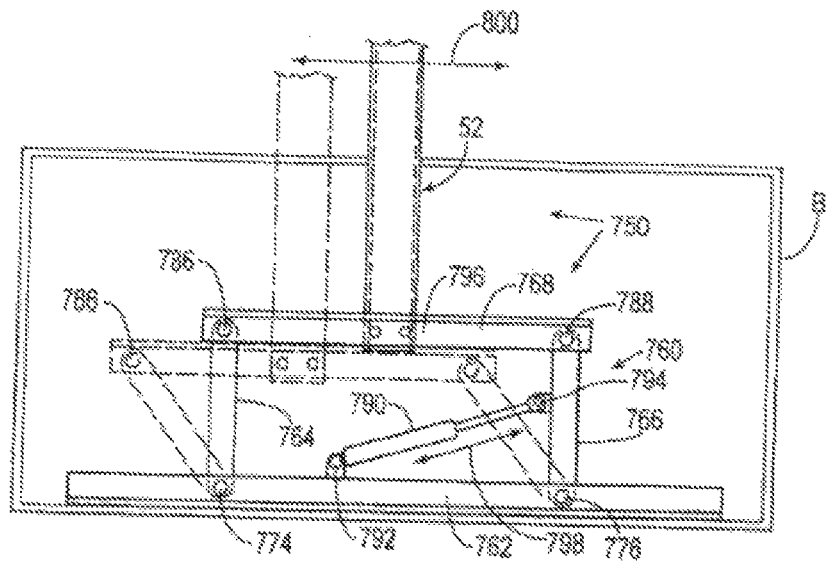
FIG. 18 depicts a positioning system that is constructed with lateral pivotal movement of the lower end of the mast in accordance with embodiments of the present invention.
Figure 19:
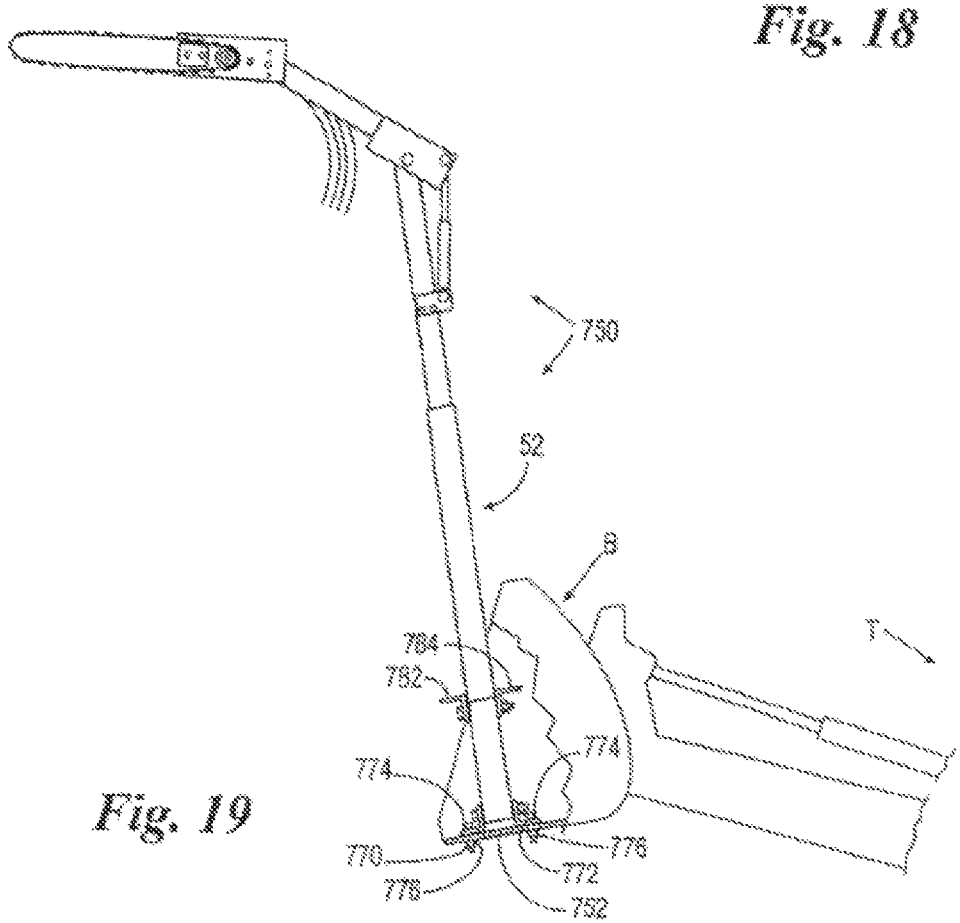
FIG. 19 depicts the positioning system of FIG. 18 attached to a tractor bucket.

Referring now to FIGS. 18 and 19, a lateral adjustment system 750 is shown mounted in inner bottom 752 of the tractor bucket B. A four-point linkage assembly 760 is formed by a horizontal base 762, parallel vertical members 764, 766 of equal length, and a horizontal top 768. The horizontal base 762 consists of two parallel L-shaped members 770, 772 secured to the inner bottom 752 of the bucket B by bolts 774 and nuts 776. One end of the vertical member 764 is pivotally attached to the horizontal base 762 by a left bottom pivot bolt 778, and one end of the parallel vertical member 766 is pivotally attached to the horizontal base 762 by a right bottom pivot bolt 780. The horizontal top 768 consists of two parallel L-shaped members 782, 784. The other end of the vertical member 764 is pivotally attached to the horizontal top 768 by a left top pivot bolt 786, and the other end of the vertical member 766 is attached to the horizontal top 768 by a right top pivot bolt 788. A hydraulic cylinder 790 is attached at one end to a mounting tab 792 attached to the horizontal base 762. The other end of the hydraulic cylinder 790 is attached to a mounting tab 794 located on the inside of the vertical member 766. The telescoping mast assembly 52 is attached to a middle portion 796 of the horizontal top 768. Movement of the hydraulic cylinder 790 along direction reference 798 causes the telescoping mast assembly 52 to move responsively along direction reference 800 while maintaining the telescoping mast assembly 52 perpendicular to the horizontal top 768.

The present embodiments have been described as being adaptable for use with a variety of ground-based vehicles to which the telescoping mast assembly 52 is attached, but the embodiments are not so limited. In alternative equivalent embodiments the telescoping mast assembly 52 can be attached to other vehicles such as an upstanding sidewall of a pickup bed, to a bale spike frame, to a skid loader, to a backhoe, to an ATV, and the like. Although some of these vehicles may not contain a hydraulic power source, an auxiliary power source or an alternative type of power source such as an air compressor with pneumatic embodiments can be used.

Additionally, the present embodiments have been described as being adaptable for use in positioning a powered chain saw, but the embodiments are not so limited. In alternative equivalent embodiments a variety of other work articles can be positioned in hard-to-reach elevated locations.

The foregoing description of embodiments of the present invention have been presented for purposes of illustration and description. The description does not limit the contemplated embodiments to the forms disclosed, and many modifications and variations are possible in light of the description. The embodiments were chosen and described in order to best explain the principles of the embodiments of the invention, to thereby enable others skilled in the art to understand the various embodiments with various modifications as are suited to the particular use contemplated.

What is claimed:

1. A positioning system used with a vehicle so that a user in the vehicle can remotely operate a power tool having a cutting edge for cutting a severable member, the positioning system comprising:

a mast that is attachable to the vehicle;
an arm supported at a proximal end to the mast by a pivot connection and supporting the power tool at a distal end, the arm and the mast cooperatively forming an angle therebetween so that when the mast is attached to the vehicle the power tool is viewable by the user from the vehicle along a line of sight;
and
a flexible strap that is, when the mast is attached to the vehicle, connected at a top end to the arm and connected at a bottom end to the mast below the pivot, the flexible strap being taut when the cutting edge is in an inoperable cutting position so the full weight of the power tool and the arm urges the cutting edge downward, the flexible strap being slightly slack when the cutting edge contacts the severable member, and after contact the flexible strap being taut again if the cutting edge is moved too slow through the severable member and the flexible strap being highly slack if the cutting edge is moved too fast through the severable member.

2. The positioning system of claim 1 wherein the pivot connection comprises a pin that abuttingly engages the mast to limit articulation of the arm at a predetermined maximum value of the first angle.

3. The positioning system of claim 1 wherein the flexible strap comprises a high visibility material.

4. The positioning system of claim 1 further comprising a receiver member that is attachable to a vehicle, the receiver member defining a passage that is sized to receivingly engage a proximal end of the mast in a close mating relationship to operably support the apparatus during motion of the vehicle.

5. The positioning system of claim 1 wherein the power tool comprises a hydraulically powered component and a cutting member, and wherein a portion of a hydraulic fluid supplied to power the hydraulically powered component is selectively diverted to lubricate the cutting member.

6. The positioning system of claim 5 wherein the hydraulically powered component and cutting member are constituent components in a chain saw.

7. The positioning system of claim 6 wherein the hydraulically powered component comprises an output shaft, wherein a chain drive sprocket is welded to the output shaft to fix them together in operable rotation.

8. The positioning system of claim 2 wherein the pivot connection comprises a pivot bracket supporting the arm and pivotally connected to the mast, the pivot bracket defining a first opening that is sized for removable insertion of the pin.

9. The positioning system of claim 8 wherein the pivot bracket defines a second opening, the flexible strap is removably connectable between the pivot bracket and the mast, and when the flexible strap is disconnected the arm is rotatable to an inoperable folded arrangement where the second opening aligns with a third opening defined by the mast, the second and third openings sized to receive the pin to affix the arm and the mast together in the inoperable folded arrangement.

* * * * *